United States Patent
Park

(10) Patent No.: US 10,107,522 B2
(45) Date of Patent: Oct. 23, 2018

(54) SOLAR ENERGY COLLECTING MODULE USING VACUUM PANEL

(71) Applicant: XL CO., LTD., Gangwon-do (KR)

(72) Inventor: Rae Jun Park, Gangwon-do (KR)

(73) Assignee: XL CO., LTD., Gangwon-do (KR)

(*) Notice: Subject to any disclaimer, the term of this patent is extended or adjusted under 35 U.S.C. 154(b) by 667 days.

(21) Appl. No.: 14/314,147

(22) Filed: Jun. 25, 2014

(65) Prior Publication Data
US 2015/0267939 A1    Sep. 24, 2015

(30) Foreign Application Priority Data
Mar. 19, 2014  (KR) .................. 10-2014-0032048

(51) Int. Cl.
| | |
|---|---|
| *F24J 2/50* | (2006.01) |
| *F24S 10/40* | (2018.01) |
| *F24S 10/75* | (2018.01) |
| *F24S 80/54* | (2018.01) |
| *F24S 80/52* | (2018.01) |
| *F24S 25/60* | (2018.01) |
| *F24S 80/50* | (2018.01) |
| *F24S 25/00* | (2018.01) |

(52) U.S. Cl.
CPC ............. *F24S 10/40* (2018.05); *F24S 10/755* (2018.05); *F24S 80/54* (2018.05); *F24S 80/52* (2018.05); *F24S 2025/011* (2018.05); *F24S 2025/6013* (2018.05); *F24S 2080/503* (2018.05); *Y02E 10/44* (2013.01)

(58) Field of Classification Search
CPC .......................................... F24J 2/05
USPC .................... 126/651–653, 658–662, 706
See application file for complete search history.

(56) References Cited

U.S. PATENT DOCUMENTS

| | | | | |
|---|---|---|---|---|
| 4,180,055 A | * | 12/1979 | Hudnall ................ | F24J 2/05 126/658 |
| 2007/0039611 A1 | * | 2/2007 | Benvenuti .............. | F24J 2/05 126/652 |
| 2014/0026885 A1 | * | 1/2014 | Aiso .................... | F24J 2/465 126/652 |

* cited by examiner

*Primary Examiner* — Vivek Shirsat

(57) ABSTRACT

Provided is a vacuum solar thermal collector module including a case having an open top and an internal space, a vacuum thermal collector panel provided inside the case and having a vacuum inside, and an insulation disposed between the vacuum thermal collector panel and the case to block heat transfer, wherein the vacuum thermal collector panel is plural and arranged in a horizontal direction inside the case.

14 Claims, 7 Drawing Sheets

<Prior Art>

SOLAR ENERGY COLLECTING MODULE USING VACUUM PANEL

CROSS-REFERENCE TO RELATED APPLICATION

This application claims priority of Korean Patent Application No. 10-2014-0032048, filed on Mar. 19, 2014, in the KIPO (Korean Intellectual Property Office), the disclosure of which is incorporated herein entirely by reference.

BACKGROUND OF THE INVENTION

Field of the Invention

The present disclosure relates to a thermal collector panel for collecting solar thermal energy and a module comprising a plurality of thermal collector panels, and more particularly, to a vacuum solar thermal collector module that may absorb solar thermal energy collected inside using a vacuum thermal collector panel made of glass efficiently at a minimum loss and convey it to a heating medium, in particular, a large-scaled solar thermal collector module comprising a plurality of vacuum thermal collector panels.

Description of the Related Art

Generally, as a method for using solar heat as an energy source, a method of using a solar cell which collects solar heat and generates electrical energy is widely known. As a method for using solar heat other than the foregoing-described method for using solar heat by converting to electrical energy, there are various types of thermal collection devices that may collect solar radiation efficiently and use it as a heating source directly or indirectly.

That is, through a method that allows a heating medium to absorb thermal energy through heat transfer after a thermal collector panel absorbs radiant light rays from the sun and flows the heated heating medium, hot water is produced and used for building cooling and heating and hot water supply, or utilized in industrial process heat, thermal electric power generation, and the like. A key of a technology for harnessing solar thermal energy is solar thermal collection, solar thermal storage, and system control, and because solar thermal energy has a low energy density and a big variation with seasons and time of the day, thermal collection and storage is a basic technology, and thus, various attempts for thermal collection and storage have been made.

FIG. 1 illustrates an example of a solar thermal collector panel according to a related art.

Referring to FIG. 1, the conventional solar thermal collector panel includes a metal case 1 in a shape with an open top and an internal space and a transmission glass window 2 covering the top of the metal case 1. The glass window is transparent and allows sunlight penetration therethrough to bring radiant energy from the sun into the solar thermal collector panel. Inside the thermal collector panel, an insulation 3 and a thermal collector plate 4 are stacked on the metal case 1 in a sequential order. The thermal collector plate 4 is where solar thermal energy entering through the transmission glass window 2 is collected, and uses a suitable material for heat collection. The insulation 3 is provided between the thermal collector plate and the metal case to block heat to prevent heat transfer therebetween.

Also, a thermal absorber plate joined with a heating medium pipe 5 through which a heating medium flows is disposed between the thermal collector plate and the insulation. Solar thermal energy collected in the thermal absorber plate 4 is conveyed to the heating medium flowing in the heating medium pipe 5 and stored in a heat storage device through a heat exchanger.

However, the conventional solar thermal collector panel has a problem with a failure to convey solar thermal energy to a heating medium effectively and a loss of solar thermal energy.

That is, a loss of energy (a) caused by reflection on the surface of the transmission glass window occurs, and heat reflected off the surface of the thermal collector plate or heat absorbed in the thermal collector plate experiences a loss of energy (b) caused by convection of an air layer itself inside where the thermal collector plate 4 is mounted. In this instance, a very large loss of energy, to be concrete, an amount of loss of energy (b) equivalent to about 23% of the total incoming solar thermal energy occurs due to the presence of the air layer inside the thermal collector panel.

Also, because the insulation 3 cannot perform a perfect insulation function, a loss of energy (c) occurs due to leaks of thermal energy collected by the thermal collector plate 4 though the insulation 3 and the metal case 1 by conduction.

Also, conventionally, there is a solar thermal collector product with a vacuum inside, but a large amount of heat generates from surfaces of glass flat plates mounted at the top and bottom of a vacuum thermal collector, as a result, the upper and lower glasses of the thermal collector are prone to stress due to a temperature difference, and when the glasses are damaged, the overall thermal collector needs to be replaced, unfortunately, damage to a certain part results in a loss of overall function.

Also, due to a vacuum inside, a thick front surface transmission glass window is used to resist an atmospheric pressure load against the internal vacuum, and for this reason, there are disadvantages of a heavy weight, high material costs, and an increase in absorption loss of the front surface transmission glass window itself.

SUMMARY OF THE INVENTION

The present disclosure is directed to providing, as a solar thermal collection device, a vacuum thermal collector panel with a vacuum inside to prevent an energy loss caused by convection of an air layer present inside a conventional atmospheric pressure flat plate thermal collection device and an energy loss caused by conduction of an insulation, and a vacuum solar thermal collector module with an increased heat collection efficiency having a vacuum thermal collector panel mounted therein.

Also, the present disclosure is directed to providing a shape and a structure of a vacuum thermal collector panel designed to have a sufficient strength to resist an atmospheric pressure load against an internal vacuum, as a member used in a vacuum solar thermal collector module.

Also, the present disclosure is directed to achieving a large scale and a light weight of a solar thermal collector as a solution that provides a solar thermal collection device including a plurality of vacuum thermal collector panels arranged horizontally.

According to the present disclosure, there is provided a vacuum solar thermal collector module including a case having an open top and an internal space, a vacuum thermal collector panel provided inside the case and having a vacuum inside, and an insulation disposed between the vacuum thermal collector panel and the case to block heat transfer, wherein the vacuum thermal collector panel is plural and arranged in a horizontal direction inside the case, and the vacuum thermal collector panel includes an upper transmission window and a lower support plate disposed at a top and a bottom thereof with a predetermined spacing therebetween, and a thermal absorber plate disposed between the upper transmission window and the lower support plate and spaced away from the upper transmission window and the lower support plate to absorb solar heat, and a heating medium circulation pipe coupled to the thermal absorber plate.

A heating medium circulation pipe adapter is formed at one side of the vacuum thermal collector panel, the heating medium circulation pipe adapter disposed between the upper transmission window and the lower support plate to support the upper transmission window and the lower support plate, and having a through-hole through which the heating medium circulation pipe passes, to support the heating medium circulation pipe.

The upper transmission window and the lower support plate may be in a plate type shape of parallel arrangement or a round type shape of a convex center.

The lower support plate is made of glass or a metal, and in the case of the parallel plate type, has a shape in a repeating pattern of a linear part (b) having a linear cross section and a curved part (a) having a convex curved cross section (FIG. 6) or in a repeating pattern of a convex curve and a concave curve, and in the case of the round type, has a shape in a linear part (b) having a linear cross section and a curved part (b) having a convex curved cross section or in a repeating pattern of a convex curve and a concave curve.

The round-type is formed in singular or plural number over the upper transmission window and the lower support plate.

Spacers for strength reinforcement are provided between the upper transmission window and the lower support plate to support the upper transmission window and the lower support plate.

The spacer is made of at least one of a metal, glass, and a ceramic, and is a shape of a cylinder or a square pillar or a rod disposed in a horizontal direction.

A getter is mounted or coated inside the vacuum thermal collector panel.

The vacuum thermal collector panel further includes side support spacers at the sides thereof, disposed between the upper transmission window and the lower support plate to provide support to maintain a space therebetween, and the side support spacers are made of a metal or glass in a shape of a plate having both ends joined to the upper transmission window and the lower support plate, or have a curved or corrugated shape of a thin metal.

The vacuum solar thermal collector panel according to the present disclosure has an effect of effectively transferring heat to a thermal absorber plate and a heating medium circulation pipe within an internal vacuum space by preventing a loss of heat caused by convection and conduction because the solar thermal collector panel has a vacuum in an internal space where heat from the sun is collected.

Also, a structure and a shape of the vacuum solar thermal collector panel of the present disclosure produces effects of providing sufficient resistance to an atmospheric pressure load against an internal vacuum pressure and continuously maintaining a vacuum pressure lower than or equal to $10^{-3}$ torr after vacuum sealing by a getter mounted or coated in vacuum.

Also, the vacuum solar thermal collector module of the present disclosure achieves a large scale by horizontally arranging a plurality of vacuum thermal collector panels.

Particularly, because vacuum thermal collector panels are each provided independently, when a certain vacuum thermal collector panel among the vacuum thermal collector panels is damaged, only the damaged panel needs to be replaced, so there is no concern of a loss of an overall function, brining an effect of reducing maintenance and repair costs.

Also, the vacuum thermal collector panel of the present disclosure improves durability against a temperature difference and durability against a pressure difference, and thus allows manufacture of a front side transmission glass window with a reduced thickness, as a result, an absorption rate of a transmission glass window reduces and efficiency is improved as well as light weight is achieved.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, the terms such as "first", "second", and the like can be used for explaining various components but such components should not be limited by these terms. These terms do not imply any particular order, but they are included to identify individual elements. For example, a first component may be called a second element, and the second element may also be called the first element, without departing from the scope of the present disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1:
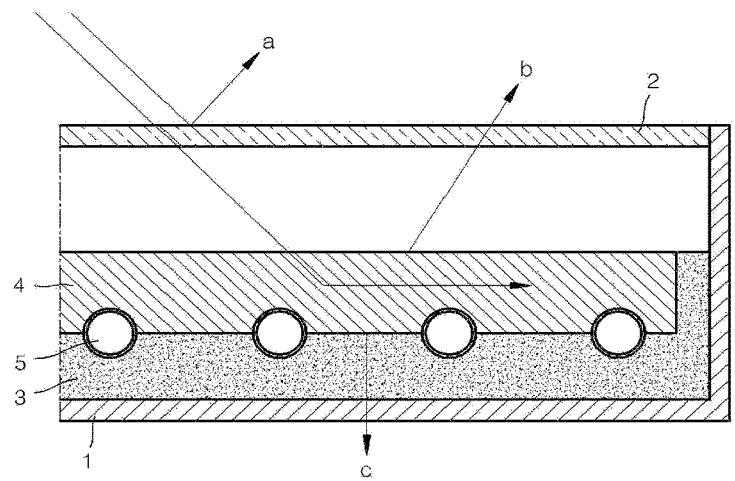
FIG. 1 is a side cross-sectional view illustrating a solar thermal collector panel according to a related art.
Figure 2:
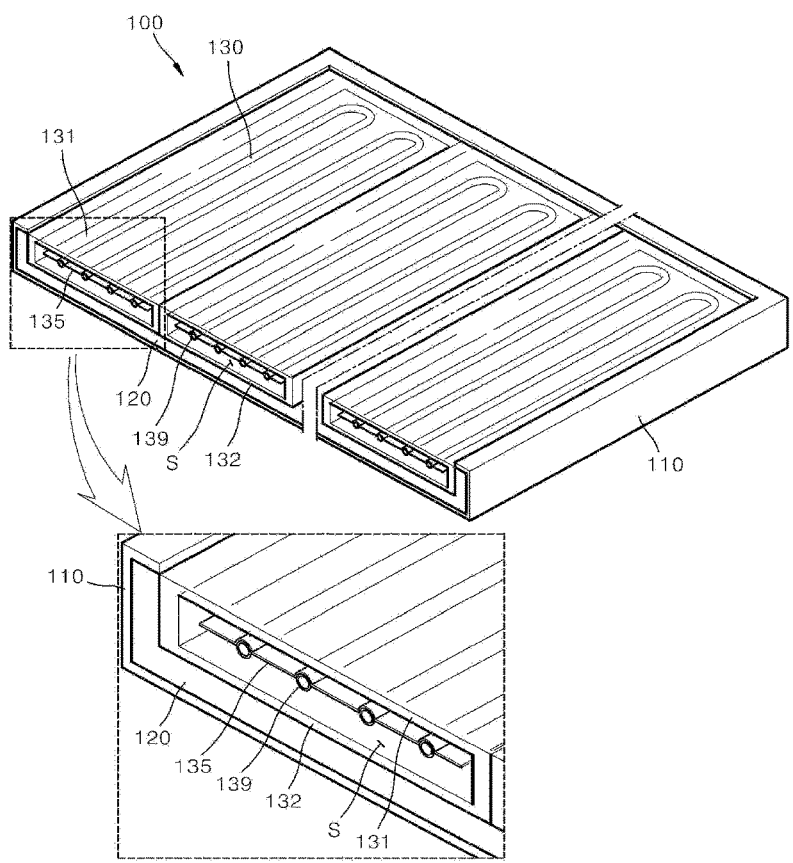
FIG. 2 is a perspective view of a vacuum solar thermal collector module according to an exemplary embodiment, illustrating a structure of a plurality of plate-type vacuum thermal collector panels mounted and arranged therein.
Figure 3:
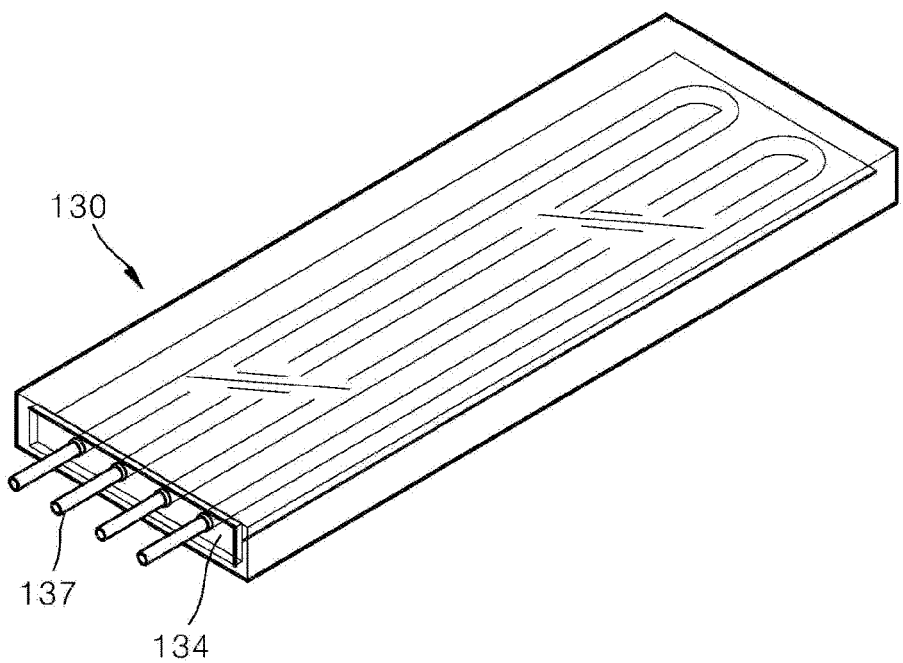
FIG. 3 illustrates a structure of a plate-type vacuum thermal collector panel as a constituent part of the vacuum solar thermal collector module of FIG. 2.
Figure 4A:
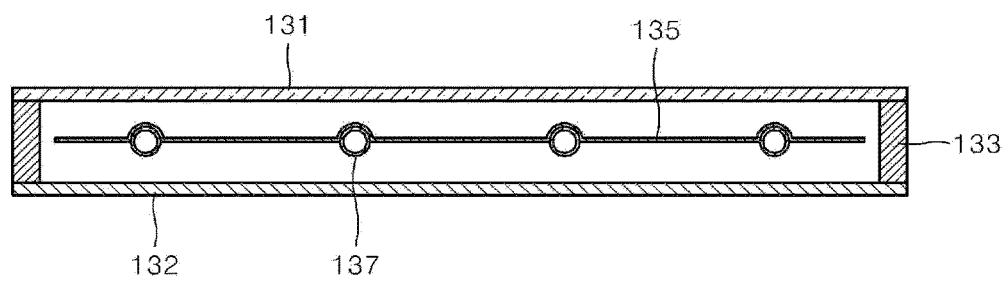
FIGS. 4a and 4b are cross-sectional views illustrating the vacuum thermal collector panel of FIG. 3.
Figure 4B:
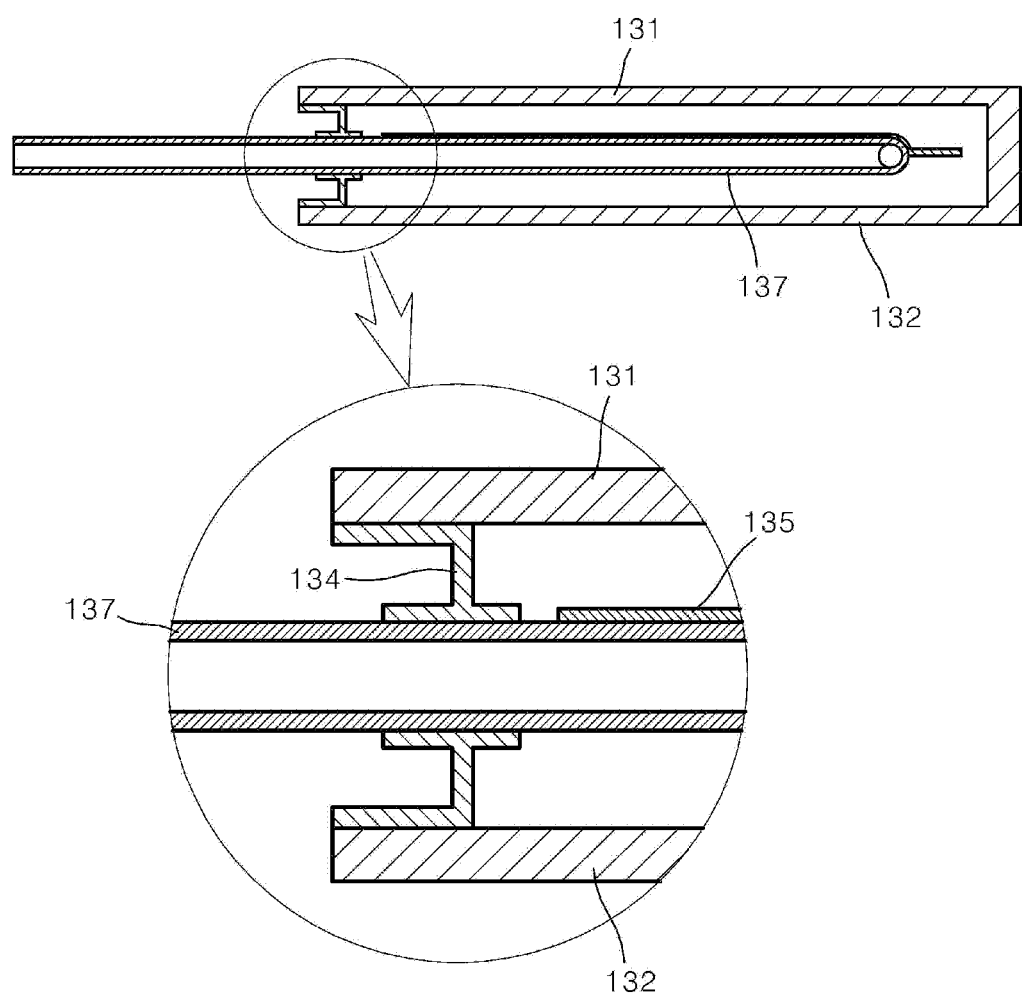

FIG. 2 is a perspective view of a vacuum solar thermal collector module according to an exemplary embodiment, illustrating a structure of a plurality of plate-type vacuum thermal collector panels mounted and arranged therein, FIG. 3 illustrates a structure of a plate-type vacuum thermal collector panel as a constituent part of the vacuum solar thermal collector module of FIG. 2, and FIGS. 4a and 4b are cross-sectional views illustrating the vacuum thermal collector panel of FIG. 3.

Referring to FIG. 2, the vacuum solar thermal collector module 100 includes a case 110 made of a metal having a generally open top and an internal space with side surfaces and a lower surface, and an insulation 120 provided at an inner surface of the case 110 to prevent heat transfer between the case 110 made of a metal and a vacuum thermal collector panel 130. The insulation 120 is disposed inside the lower surface and the side surfaces of the case and configured to surround the vacuum thermal collector panel 130 disposed inside.

In the present disclosure, the vacuum thermal collector panel 130 is provided plurally, and arranged adjacent to each other in a horizontal direction within the case 110. By arranging a necessary number of vacuum thermal collector panels in a horizontal direction, the vacuum solar thermal collector module 100 may increase in size freely, thereby achieving a large scale.

Also, in the present disclosure, when a portion of vacuum thermal collector panels belonging to the vacuum solar thermal collector module is broken or damaged, only a corresponding vacuum thermal collector panel needs to be replaced, and thus, it is easy to maintain and repair and costs involved in maintenance and repair reduce. Also, because each vacuum thermal collector panel 130 is independently formed (each pipe through which a heating medium flows is independently formed), even though a certain vacuum thermal collector panel 130 loses its function, a function of other vacuum thermal collector panel 130 is maintained, so an overall function of the solar thermal collector module 100 is performed without a big problem.

As for the plate-type vacuum thermal collector panel 130, referring to FIGS. 3, 4a, and 4b, the plate-type vacuum thermal collector panel 130 has a structure of supporting an external atmospheric pressure load in a vacuum ($10^{-3}$ torr) state inside, and the plate-type vacuum thermal collector panel 130 includes an upper transmission window 131 to allow transmission of sunlight, a lower support plate 132 to provide support at the bottom, and a side support spacer 133 interposed between the upper transmission window 131 and the lower support plate 132 to maintain a space therebetween, and allows an internal space to maintain in a vacuum state less than or equal to $10^{-3}$ torr.

The upper transmission window 131 preferably uses a boric acid glass or a low metal glass having a high solar transmissivity. A boric acid glass is a result by adding boron oxide ($B_2O_3$) to a general glass composition and has a lower thermal expansion rate than a general glass, and thus, is used in applications under severe temperature changes, for example, a discharge tube, a combustion tube, a laboratory equipment, and the like. It should be noted that the listing of the above materials should not be seen as to limit the scope of the present invention. Other materials may be used without departing from the spirit and scope of the present invention. The upper transmission window 131 may be coated with a metal, an inorganic material, and an organic material on the surface thereof to increase light transmissivity and reduce reflectivity.

The lower support plate 132 and the side support space 133 may be made of a proper material such as glass or a metal. However, the present invention is not limited to such materials.

The upper transmission window 131, the lower support plate 132, and the side support space 133 are preferably joined and vacuum-sealed by brazing or glass-metal bonding to maintain a vacuum inside, and the internal space preferably maintains a degree of vacuum of about $10^{-3}$ torr. To maintain a degree of vacuum, a non-diffusion getter may be coated on the edges of the upper transmission window or all or a part of the surface of the side support spacer or the lower support plate, or may be coated as a thin film at a proper location.

Also, the plate-type vacuum thermal collector panel 130 according to the present disclosure includes a thermal absorber plate 135 to absorb heat from the sun and a heating medium circulation pipe 137 within the vacuum space. The thermal absorber plate 135 may be coated with a metal, an inorganic material, and an organic material to increase light transmissivity and reduce reflectivity. Also, the thermal absorber plate 135 and the heating medium circulation pipe 137 may be connected to come into contact with each other by brazing joining or close bonding to transfer heat absorbed by the thermal absorber plate to the heating medium circulation pipe. Brazing is a process that joins both basic materials to be joined by adding a filler metal at temperature lower than or equal to a melting point of the both basic materials, whereby the basic materials are joined without damage, and because a brazing technique itself uses a well-known method in the art, its specific description is omitted herein.

In the present disclosure, because the thermal absorber plate 135 and the heating medium circulation pipe 137 are mounted in the internal space in a vacuum atmosphere of $10^{-3}$ torr, a loss of collected energy caused by convection may be prevented. Also, the insulation 120 prevents a loss of radiant heat through the case 110 by convection.

The thermal absorber plate 135 is where solar thermal energy going inside through the upper transmission window is collected, and for this, uses a suitable material for heat collection, and may be coated with a film (not shown) for increasing a solar thermal absorption rate and preventing reflection on an upper surface thereof. The reflection preventing film is a film that serves to absorb solar radiant heat, generate heat, and prevent reflection of sunlight, and generally, may use black chrome plating and a black titanium coating (titanium dioxide thin film). This is to facilitate absorption of solar radiant heat and heat transfer by using a metal having a high density and a black color. Besides, graphite powder may be additionally coated.

The heating medium circulation pipe 137 is a pipe through which a heating medium for heat transfer flows, and solar thermal energy transmitted through the thermal absorber plate is conveyed to the heating medium, and the heated heating medium flows to the heat exchanger and is stored in the heat exchange and storage device, and is used according to the purpose of application.

A heating medium circulation pipe adapter 134 is formed in the plate-type vacuum thermal collecting panel, and the heating medium circulation pipe adapter 134 is disposed between the upper transmission window 131 and the lower support plate 132 at one side where the side support space 133 is mounted, to support the upper transmission window 131 and the lower support plate 132, and has a through-hole through which the heating medium circulation pipe 137 passes, to support the heating medium circulation pipe 137. The heating medium circulation pipe adapter 134 is made from a metal, and includes a vertical member and a horizontal member bent in a horizontal direction at a top and a bottom of the vertical member, and the vertical member has the through-hole through which the heating medium circulation pipe passes. Also, each horizontal member located at the top and the bottom of the heating medium circulation pipe adapter is joined to the upper transmission window and the lower support plate.

Figure 5:
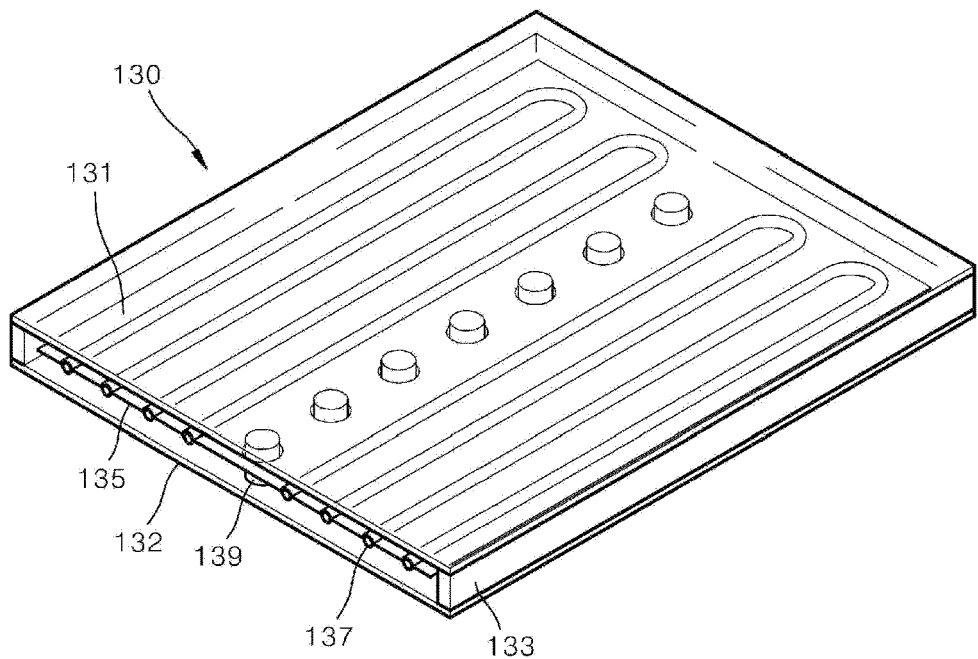
FIG. 5 illustrates a structure of a plate-type vacuum thermal collector panel according to the present disclosure, provided with a spacer.

FIG. 5 illustrates a structure of the plate-type vacuum thermal collector panel according to the exemplary embodiment of the present disclosure, provided with a spacer. The plate-type vacuum thermal collector panel 130 shown in FIG. 5 may further include an inner space 139 in the internal vacuum space. The spacer 139 passes through an opening formed in the thermal absorber plate 135 within the internal space of the vacuum thermal collector panel 130, and is mounted in between the upper transmission window 131 and the lower support plate 132 to serve to support the upper transmission window 131 and the lower support plate 132. That is, when the vacuum thermal collector panel 130 increases in scale, the spacer 139 serves to support the upper transmission window 131 and the lower support plate 132. The spacer 139 is arranged at a proper location in a proper number, and serves to resist an external atmospheric pressure load effectively when the thermal collector panel creates a vacuum ($10^{-3}$ torr) inside. Those of ordinary skill in the art will recognize that the number and arrangement of spacers may be varied in accordance with a particular application thereof.

FIG. 5 shows a shape of the spacer as a vertical cylindrical shape, but this is for illustration only, and the spacer may be interposed between the upper transmission window 131 and the lower support plate 132 in various shapes, for example, a square pillar shape, a ball, a tube, and the like, to support the upper transmission window and the lower support plate. As a material for the spacer 139, various materials may be applied, for example, glass, metals including ceramic, organic and inorganic materials, and the like.

Figure 6:
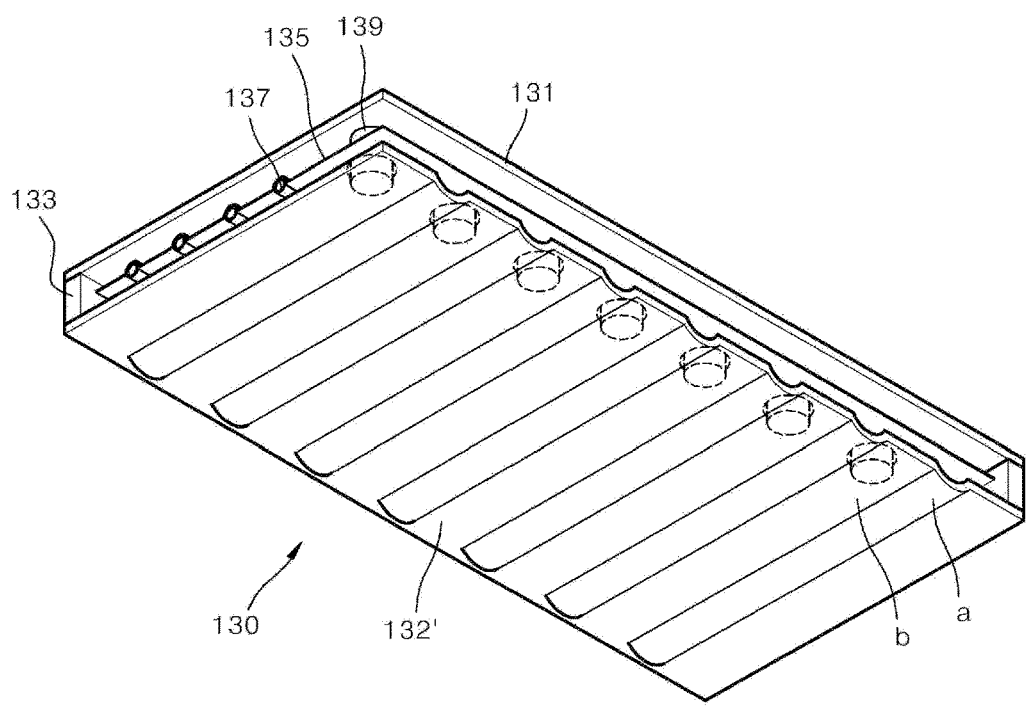
FIG. 6 illustrates a structure of a partial modification example of a plate-type vacuum thermal collector panel according to the present disclosure, in which a plate-type lower support plate has a curved shape.

FIG. 6 illustrates a structure of a partial modification example of the plate-type vacuum thermal collector panel according to the present disclosure, in which a plate-type lower support plate has a curved shape. The plate-type vacuum thermal collector panel described in the foregoing is equipped with the upper transmission window at the top to allow light transmission and the lower support plate made of glass or a metal at the bottom to support a load and strength. However, in FIG. 6, the lower support plate 132' has a repeating pattern of a convex shape and a flat shape rather than an overall flat shape. That is, when viewed in cross section, the lower support plate 132' has a repeating pattern of a linear part (b) having a linear cross section and a curved part (a) having a convex curved cross section. By forming the lower support plate in a repeating pattern of a convex part and a flat part at a predetermined interval rather than an overall flat shape, a strength improvement effect is produced, as a consequence, even though a glass or metal plate reduces in thickness, more effective resistance to an internal vacuum atmospheric pressure load and light weight may be achieved.

Although the drawing shows that the lower support plate of the vacuum thermal collector panel has a curved shape in a repeating pattern of a curved part (a) having a convex curved cross section and a linear part (b) having a linear cross section, the shape is not limited to the illustrated shape and a curved shape in a repeating pattern of a curved cross section (i.e., a concave cross section) in the opposite side to a convex cross section may be contemplated, and this will be equally applied to a shape of a round-type lower support plate as described below.

Figure 7:
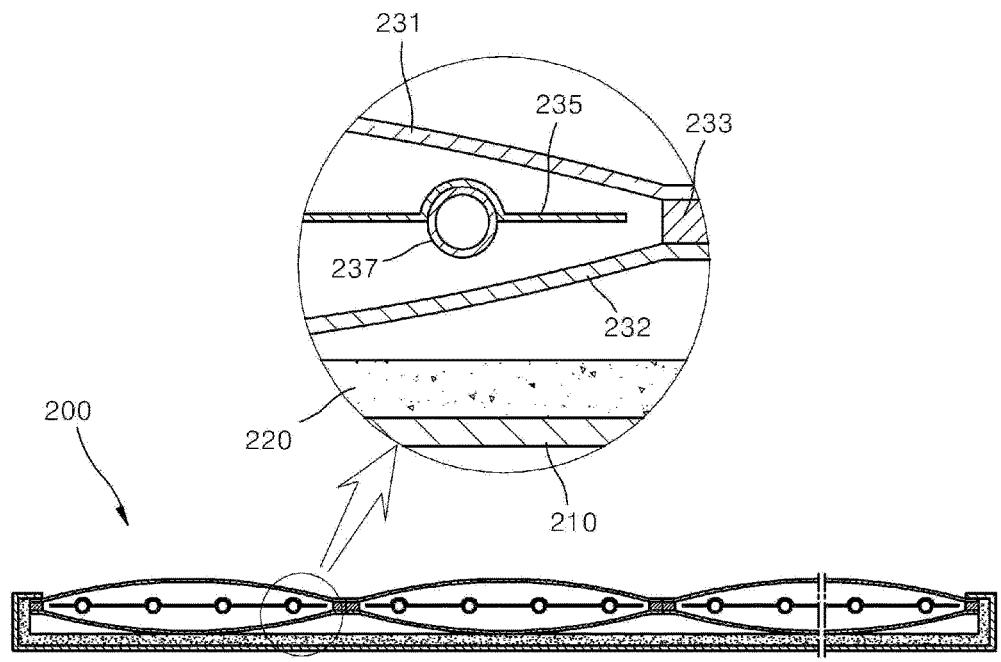
FIG. 7 is a perspective view of a vacuum solar thermal collector module according to another exemplary embodiment, illustrating a structure of a plurality of round-type vacuum thermal collector panels mounted and arranged therein.
Figure 8:
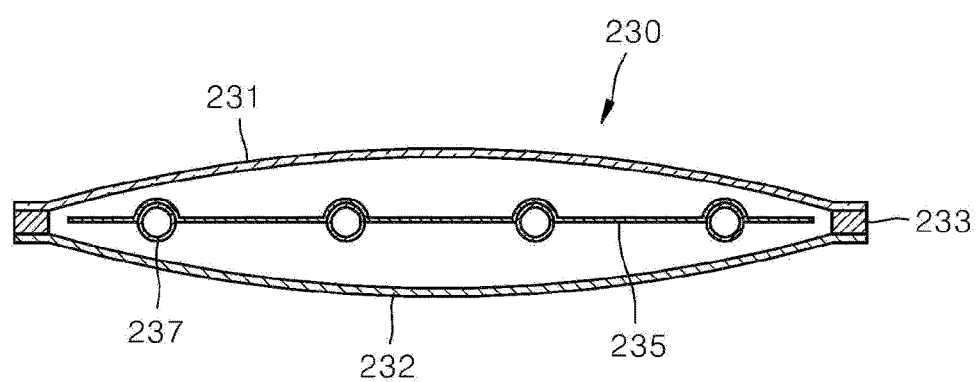
FIG. 8 illustrates a structure of a round-type vacuum thermal collector panel as a constituent part of the vacuum solar thermal collector module of FIG. 7.
Figure 9:
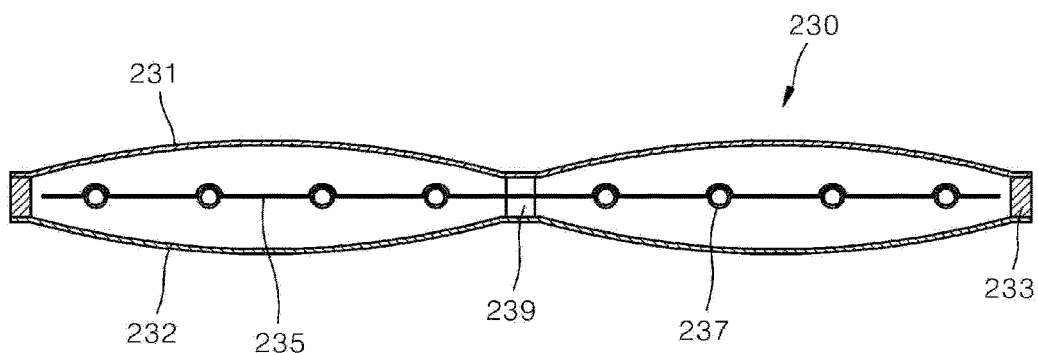
FIG. 9 illustrates a structure of a round-type vacuum thermal collector panel according to the present disclosure, provided with a spacer.
Figure 10:
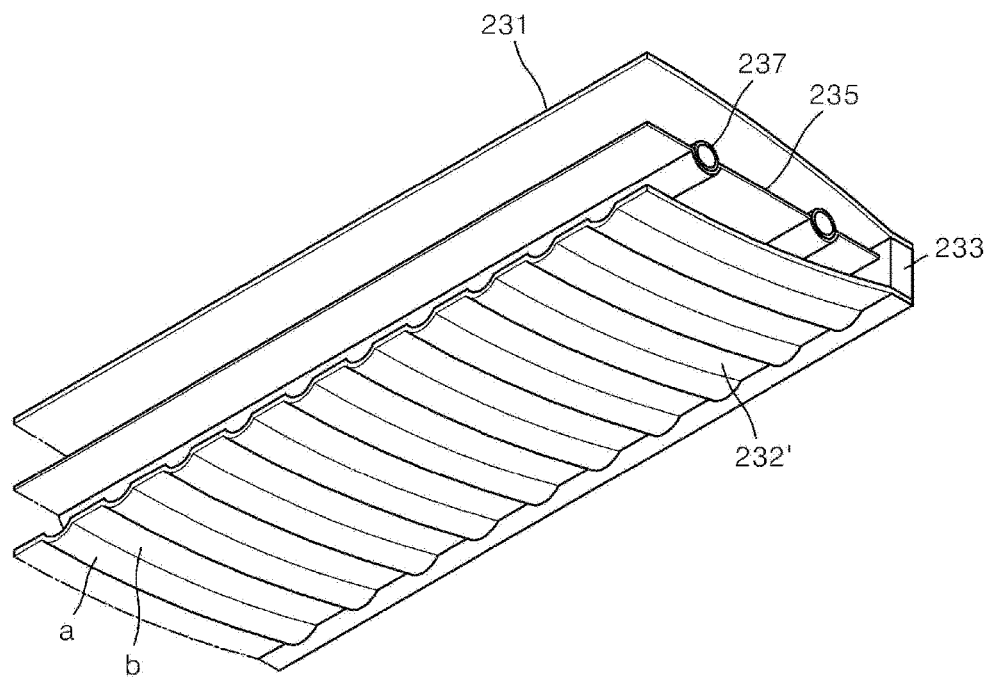
FIG. 10 illustrates a cross-sectional structure of a partial modification example of a round-type vacuum thermal collector panel according to the present disclosure, in which a round-type lower support plate has a curved shape.

FIG. 7 is a perspective view of a vacuum solar thermal collector module according to another exemplary embodiment, illustrating a structure of a plurality of round-type vacuum thermal collector panels (FIGS. 8 and 9) mounted and arranged therein, FIG. 8 illustrates a structure of a round-type vacuum thermal collector panel 230 as a constituent part of the vacuum solar thermal collector module 200 of FIG. 7, FIG. 9 illustrates a structure of a round-type vacuum thermal collector panel 230 according to the present disclosure, provided with a spacer 239, and the structure may have a repeating pattern of at least two round structures, and FIG. 10 illustrates a cross-sectional structure of a partial modification example of a round-type vacuum thermal collector panel according to the present disclosure, in which a round-type lower support plate 232' has a curved shape.

Referring to FIGS. 7 and 8, the vacuum solar thermal collector module 200 according to this embodiment includes a case 210 made of a metal having a generally open top and an internal space with side surfaces and a lower surface, and an insulation 220 provided at an inner surface of the case 210 to prevent heat transfer between the case 210 made of a metal and a vacuum thermal collector panel 230. The insulation 220 is disposed inside the lower surface and the side surfaces of the case and configured to surround the vacuum thermal collector panel 230 disposed inside. Also, in the present disclosure, the round-type vacuum thermal collector panel (FIGS. 8 and 9) is provided plurally and each independently, and is arranged adjacent to each other in a horizontal direction within the case. By arranging a necessary number of round-type vacuum thermal collector panels in a horizontal direction, the vacuum solar thermal collector module 200 may increase in size freely, thereby achieving a large scale.

The round-type vacuum thermal collector panel 230 according to the exemplary embodiment of the present disclosure includes an upper transmission window 231 to allow transmission of sunlight, a lower support plate 232 to provide support at the bottom, and a side support spacer 233 interposed between the upper transmission window and the lower support plate to maintain a space therebetween, the upper transmission window 231 and the lower support plate 232 are joined and vacuum-sealed by the side support spacer 233 at the sides to allow an internal space to maintain in a vacuum state ($10^{-3}$ torr), and a thermal absorber plate 235 and a heating medium circulation pipe 237 are included within the internal space. The upper transmission window 231 is made of a boric acid glass or a low metal glass having a high solar transmissivity, and the lower support plate 232 and the side support space 233 may be made of a proper material such as glass or a metal. The upper transmission window 231, the lower support plate 232, and the side support space 233 are joined by a glass bonding or brazing technique to maintain the internal space at a degree of vacuum of about $10^{-3}$ torr, and because mounting or coating of a getter is the same as the foregoing, an overlapping description is omitted herein. Also, the thermal absorber plate 235 and the heating medium circulation pipe 237 equipped inside are also the same.

However, FIGS. 7 and 8 are characterized in that the upper transmission window 231 and the lower support plate 232 are rounded at an arbitrary R (radius) to have a shape of a convex center, dissimilar to the vacuum thermal collector panel 130 described in the previous embodiment, and for convenience, this is hereinafter referred to as a "round-type vacuum thermal collector panel". This is to resist an atmospheric pressure load caused by an internal vacuum effectively.

Also, the round-type vacuum thermal collector panel shown in FIG. 8 has a single structure in which the upper transmission window 231 and the lower support plate 232 are rounded, but the round-type vacuum thermal collector panel shown in FIG. 9 has a structure including two round structures with a convex center, and a plurality of round structures may be continuously formed. In this instance, an inner spacer 239 is disposed at a point where a space between the upper transmission window 231 and the lower support plate 232 is minimum, to support the upper transmission window 231 and the lower support plate 232. A shape of the spacer 239 may be various, and as an example, may be similar to the shape described in the previous embodiment. It is obvious that the spacer 239 also serves to resist an atmospheric pressure load caused by an internal vacuum when the round-type vacuum thermal collector panel increases in scale.

In FIG. 10, the surface of the lower support plate 232' made of glass or a metal has a structure of a combination of a round shape and a convex surface shape rather than an overall uniform shape. That is, when viewed in cross section, the lower support plate 232' shown in FIG. 10 has a repeating pattern of a linear part (b) having a linear cross section and a curved part (a) having a convex curved cross section. By forming the lower support plate in a repeating pattern of a convex part and a flat part on a round shape surface at a predetermined interval, an effect of further increasing strength is produced; as a consequence, more effective resistance to an atmospheric pressure load against an internal vacuum may be achieved.

Figure 11:
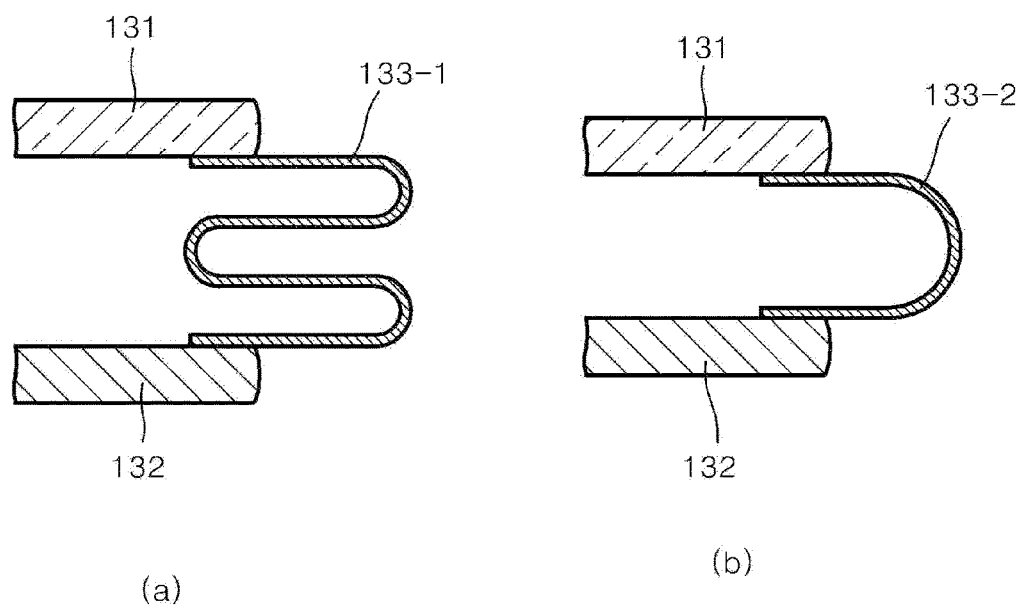
FIG. 11 illustrates a partial modification example of a side support spacer of a vacuum thermal collector panel of the present disclosure, in which a thin metal plate has a curved or corrugated structure.

FIG. 11 illustrates a partial modification example of the side support spacer of the vacuum thermal collector panel of the present disclosure.

The side support spacers 133 and 233 employed in the vacuum thermal collector panels in the description of the previous embodiments have a shape of a square member located between the upper transmission window and the lower support plate. Side support spacers 133-1 and 133-2 shown in FIG. 11 are located between the upper transmission window and the lower support plate, and have a shape of a flat metal plate having a curved or corrugated shape.

That is, the side support spacers 133-1 and 133-2 located between the upper transmission window and the lower support plate to provide support to maintain a space therebetween are made of a metal in a shape of a plate having both ends joined to the upper transmission window and the lower support plate, and have a curved shape. According to application examples, the curved shape may be a single curved shape ((b) of FIG. 11) or a corrugated shape of multiple curves ((a) of FIG. 11). This is to allow the curved shape of the side support plate to absorb stress or warpage of the upper transmission window of the vacuum thermal collector panel itself and to absorb stress or warpage caused by a temperature difference between the upper transmission window and the lower support plate.

The vacuum thermal collector panel according to the present disclosure creates a vacuum in the internal space where heat from the sun is collected to prevent a loss of heat caused by convection and conduction, thereby effectively transferring heat to the thermal absorber plate and the heating medium circulation pipe within the internal vacuum space, and the structure and shape of the vacuum thermal collector panel according to the present disclosure has effects of providing sufficient resistance to an atmospheric pressure load against an internal vacuum ($10^{-3}$ torr) and continuously maintaining the internal vacuum ($10^{-3}$ torr).

Also, the vacuum solar thermal collector module of the present disclosure achieves a large scale by arranging a plurality of vacuum thermal collector panels adjacent to each other side by side but independently from each other, and when a portion of vacuum thermal collecting panels is damaged, only a damaged panel needs to be replaced, so there is no concern of a loss of an overall function, brining an effect of reducing maintenance and repair costs. Also, the vacuum thermal collector panel of the present disclosure improves durability against a temperature difference and durability against a pressure difference, and thus allows manufacture of a front side transmission glass window with a reduced thickness, as a result, an absorption rate of the transmission glass window reduces and efficiency is improved.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A vacuum solar thermal collector module comprising:
a case having an open top and an internal space;
a vacuum thermal collector panel provided inside the case and having a vacuum inside, the vacuum thermal collector panel comprises:
an upper transmission window and a lower support plate disposed at a top and a bottom thereof with a predetermined spacing therebetween;
a thermal absorber plate disposed between the upper transmission window and the lower support plate and spaced away from the upper transmission window and the lower support plate to absorb solar heat; and
a heating medium circulation pipe coupled to the thermal absorber plate; and
an insulation disposed between the vacuum thermal collector panel and the case to block heat transfer,
wherein the vacuum surrounds the thermal absorber plate and the heating medium circulation pipe,
wherein the thermal absorber plate comprises a rounded recess, and the heating medium circulation pipe is received in the rounded recess and contacts the rounded recess.

2. The vacuum solar thermal collector module of claim 1, wherein the vacuum thermal collector panel is plural and arranged in a horizontal direction inside the case.

3. The vacuum solar thermal collector module of claim 1, wherein a heating medium circulation pipe adapter is formed at one side of the vacuum thermal collector panel, the heating medium circulation pipe adapter disposed between the upper transmission window and the lower support plate to support the upper transmission window and the lower support plate, and having a through-hole through which the heating medium circulation pipe passes, to support the heating medium circulation pipe.

4. The vacuum solar thermal collector module of claim 1, wherein the vacuum thermal collector panel is of a plate type in which the upper transmission window and the lower support plate are in parallel with each other.

5. The vacuum solar thermal collector module of claim 1, wherein the vacuum thermal collector panel is of a round type in which the upper transmission window and the lower support plate have convex centers.

6. The vacuum solar thermal collector module of claim 5, wherein the round type is formed with plural convex centers.

7. The vacuum solar thermal collector module of claim 1, wherein spacers are provided between the upper transmission window and the lower support plate to support the upper transmission window and the lower support plate.

8. The vacuum solar thermal collector module of claim 7, wherein the spacers are made from at least one material selected from the group consisting of metal, glass, and ceramic, and is in the shape of a cylinder, a square pillar, or a rod disposed in a horizontal direction.

9. The vacuum solar thermal collector module of claim 5, wherein the lower support plate of the vacuum thermal collector panel is made from at least one material selected from the group consisting of glass, and metal.

10. The vacuum solar thermal collector module of claim 5, wherein the lower support plate of the vacuum thermal collector panel has a shape in a repeating pattern of a curved part having a convex curved cross section and a linear part having a linear cross section.

11. The vacuum solar thermal collector module of claim 1, wherein a getter is coated inside the vacuum thermal collector panel.

12. The vacuum solar thermal collector module of claim 1, wherein the vacuum thermal collector panel further comprises side support spacers at the sides thereof, the side support spacers disposed between the upper transmission window and the lower support plate to provide support to maintain a space therebetween, and being made of a metal in a shape of a plate having one end joined to the upper transmission window and one end joined to the lower support plate, and having a curved or corrugated shape, whereby absorbing stress or warpage of the upper transmission window and absorbing stress or warpage caused by a temperature difference between the upper transmission window and the lower support plate.

13. The vacuum solar thermal collector module of claim 12, wherein the space is maintained in a vacuum state less than or equal to $10^{-3}$ torr.

14. The vacuum solar thermal collector module of claim 1, wherein the upper transmission window is coated with a material made from at least one selected from the group consisting of metal, organic material, and inorganic material.

* * * * *